United States Patent
Cerbini (10) Patent No.: US 8,348,764 B2
(45) Date of Patent: Jan. 8, 2013

(54) REWARD SYSTEM FOR PLAYERS OF VIDEO AND COMPUTER GAMES

(76) Inventor: Anthony P. Cerbini, Thousand Oaks, CA (US)

( * ) Notice: Subject to any disclaimer, the term of this patent is extended or adjusted under 35 U.S.C. 154(b) by 34 days.

(21) Appl. No.: 12/736,375

(22) PCT Filed: Apr. 10, 2009

(86) PCT No.: PCT/US2009/002260
§ 371 (c)(1),
(2), (4) Date: Dec. 15, 2010

(87) PCT Pub. No.: WO2009/126316
PCT Pub. Date: Oct. 15, 2009

(65) Prior Publication Data
US 2011/0092273 A1    Apr. 21, 2011

Related U.S. Application Data

(60) Provisional application No. 61/123,724, filed on Apr. 10, 2008.

(51) Int. Cl.
*A63F 9/24* (2006.01)
(52) U.S. Cl. ............................ 463/42; 463/25
(58) Field of Classification Search ................. 463/25, 463/42
See application file for complete search history.

(56) References Cited

U.S. PATENT DOCUMENTS

| | | | |
|---|---|---|---|
| 2002/0103664 A1* | 8/2002 | Olsson et al. | 705/1 |
| 2008/0020814 A1* | 1/2008 | Kernene | 463/10 |
| 2008/0046953 A1 | 2/2008 | Kossila | |
| 2008/0070665 A1 | 3/2008 | Gatto et al. | |

FOREIGN PATENT DOCUMENTS

WO    WO2009/126316    10/2009

OTHER PUBLICATIONS

International Preliminary Report on Patentability issued in connection with PCT/US2009/002260 on Oct. 12, 2010.
Written Opinion of the International Searching Authority issued in connection with PCT/US2009/002260 on Jun. 9, 2009.
International Search Report issued in connection with PCT/US2009/002260 on Jun. 9, 2009.

* cited by examiner

*Primary Examiner* — Omkar Deodhar
(74) *Attorney, Agent, or Firm* — Goodwin Procter LLP (57) ABSTRACT

A reward system for players of video games or computer games comprises:
(a) a gaming platform for participating in a video game or computer game;
(b) a data collection module in communication with the platform, wherein the data collection module obtains and stores information received from the platform and assigns rewards points based upon the data and predetermined parameters; and
(c) a purchasing module in communication with the data collection module, wherein the purchasing module receives information from the data collection module regarding the player's purchasing choices and arranges for the purchase items corresponding to the choices.

11 Claims, 6 Drawing Sheets

REWARD SYSTEM FOR PLAYERS OF VIDEO AND COMPUTER GAMES

This is a national phase filing of International Application No. PCT/US2009/02260, which was filed on Apr. 10, 2009 and published in English on Oct. 15, 2009, which application claims the benefit of priority of U.S. Provisional Application No. 61/123,724 filed on Apr. 10, 2008, the entire contents of which are incorporated by reference herein.

BACKGROUND OF THE INVENTION

1. Field of the Invention

This invention relates to a reward system to be used in connection with video game or computer software game players and/or members, and a method of using such a system.

2. Background of the Invention

The video game industry generated $21 billion in 2008, and there are over 11 million people in North America who participate as online gaming subscribers. In addition, 69% of American heads of households play computer and video games.

Moreover, 36% of American parents say they play computer and video games. Further, 80 percent of gamer parents say they play video games with their kids, and 66% feel that playing games has brought their families closer together. Thirty-eight percent of all game players are women. In fact, women over the age of 18 represent a significantly greater portion of the game-playing population (31%) than boys age 17 or younger (20%).

Forty-nine percent of game players say they play games online one or more hours per week. In addition, 34 percent of heads of households play games on a wireless device, such as a cell phone or personal digital assistant (PDA), up from 20% in 2002.

The Entertainment Software Association estimates that fifty-three percent of game players expect to be playing as much or more ten years from now than they do today. This massive audience of gamers is still within the infancy stage and will continue to grow as advancements in technology foster greater and easier accessibility into a wider demographic composition for engaging in online recreational activities.

In addition, online retail spending continues to grow at rates in excess of 20 percent year-over-year and comprises a significant portion of corporate revenue. This percentage shows no signs of slowing down or decreasing over time. The e-commerce implosion that occurred back in Y2K is no longer a consumer concern as online travel commerce, which is a more developed market, continues to experience double-digit gains.

Moreover, the Internet has emerged as a global medium for communication, information, commerce, and currently holds the largest repository of software titles for gamers.

The Internet's growing adoption rate has resulted in people who enjoy playing software games and wish to convert their hours of playtime into discounts when conducting commerce over the Internet. As consumers have recognized the advantages of e-commerce and have become more comfortable with the reliability and security of the Internet, companies have begun to offer more complex products and services online. Moreover, the adoption rate of the Internet as a vehicle for shopping has grown dramatically, and software gamers in general are typically familiar and comfortable conducting online transactions.

The growing acceptance of the Internet and e-commerce presents a significant opportunity for people to more efficiently and effectively research and purchase goods and services they desire. The vast information sharing and communications power of the Internet is expected to continue to influence significantly e-commerce for both consumers and product providers.

The present invention serves as a bridge between the gaming community and Internet commerce. For example, the invention described herein:

Can cost-effectively and efficiently reach and serve a large group of customers electronically from a central location.

Can provide personalized, low-cost and real-time customer interaction.

Will have low administrative costs because all information is captured and stored digitally.

Will constantly be collecting and collating dynamic demographic and behavioral data about customers, increasing opportunities for direct marketing and personalized services.

In addition:

Users of the present invention (referred to herein as "members") can quickly communicate or access account information without geographic or temporal limitations.

Members can enjoy discounts and greater online shopping experience.

Members can access a vast amount of information regarding the pricing, quality and specifications of products and services.

The present invention is advantageous as an Internet-based marketing and customer acquisition model for at least the following reasons:

The vast majority of computer based games are Internet accessible and require no warehousing and only physical or electronic delivery of a contract.

Through a single medium, consumers can access information and compare products and prices from a vast number of e-commerce enabled companies.

Members can compare the prices and specification of various products at their own pace, without sales pressure while exchanging their player points for an automatic discount.

Consumer data related to members can be efficiently captured through a website, allowing real-time automated customer acquisition and streamlined overall processing.

"White labeled" companies can reduce the inefficiencies and high costs associated with marketing and customer acquisition.

Possible sources of revenue from the present invention include the following:

Membership fees collected from enrolled gamers.

Advertising revenue—the website may be used as a venue for tapping into a clearly defined niche market.

Fees from marketing partners who sell context-appropriate products, such as peripherals and accessories manufacturers that are geared for the gaming community.

White labeling—by allowing PC manufacturers and affinity groups the opportunity to employ the rewards system of this invention to directly service their own constituencies.

SUMMARY OF THE INVENTION

A reward system for a player of video games or computer games comprises:
  (a) a gaming platform for participating in a video game or computer game;
  (b) a data collection module in communication with the platform, wherein the data collection module obtains and stores information received from the platform and assigns rewards points based upon the data and predetermined parameters; and
  (c) a purchasing module in communication with the data collection module, wherein the purchasing module receives information from the data collection module regarding the player's purchasing choices and arranges for the purchase of items corresponding to the choices.

In one embodiment the gaming platform is a personal computer or a videogame system such as PLAYSTATION 3®, XBOX® or Wii®.

In another preferred embodiment the data collection module is at least one computer server.

In another preferred embodiment, the purchasing module is at least one computer server.

The gaming platform, data collection module and purchasing module are all interconnected via the Internet to enable the player to use the reward system to acquire rewards points based upon various predetermined parameters, and to redeem the points acquired to purchase various items.

In one embodiment of this invention, the member is connected to the Internet via a personal computer. In another embodiment, the member is connected to the Internet via a mobile phone. In yet another embodiment, the member is connected to the Internet via a portable computing device such as a PDA.

DETAILED DESCRIPTION OF THE INVENTION

The following definitions may be useful in connection with the detailed description of the invention set forth below.

Search Engine—Search engines work by compiling and storing information about a vast universe of web pages. These pages are retrieved by "bots" (also known as web crawlers or web robots)—which is basically a scripted computer program that scourers the web, cataloging every page and link (URL) that it encounters.

Information about these web pages are processed and stored in index database for people (in this case members) to query and retrieve. The information collected is stored in cache memory as simple text words, which can be very helpful when the web page itself has been updated or changed. When a member enters a query into a search engine, the search engine examines its database it gives a listing of web pages containing the information (or in this case product) according to its criteria.

Most search engines rank the results to provide the "best" results first. Search engines are also generally commercial ventures that are supported in part by ad revenue such as "sponsored links".

Figure 1:
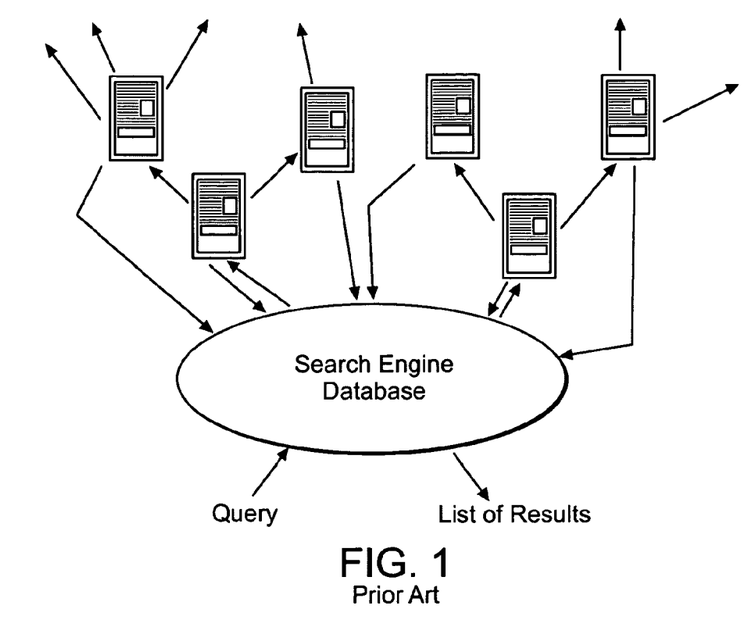
FIG. 1 depicts a schematic of web server operation.

FIG. 1 depicts a schematic of the interaction of a search engine database and a web server. As depicted in FIG. 1, a query is entered into the search engine database. The query is routed to various search engine bots that search various databases to obtain the information desired, and transmit the information obtained to the search engine database, which then prepares and outputs the information obtained as a list of results.

Heuristic Algorithms—A heuristic algorithm is an algorithm that works to return optimal results for a searched-for item. The purpose of using algorithms is to provide good or better results quickly. Algorithms are essential to the way the search engine employed in conjunction with the present invention processes information. The algorithm tells the computer server what specific steps to perform and in what order.

An example of a heuristic algorithm in connection with this invention is when a member inputs the desired item that she wants, the heuristic algorithms takes the member's input and analyzes its database for a listing of that item, with the closest matching item and merchant first. Heuristic algorithms also are used to search the database of paid advertising merchants, displaying sponsored links on the right side of the member's web browser. Heuristic algorithms also help decide what old and even new merchant web pages should be crawled and also re-crawled.

MySQL Database—A database is a structured collection of information and data that is stored in web server. A database uses computer software such as MySQL and Oracle to arrange the storage of data. The servers will use MySQL, as it is cost-effective and has excellent reliability. MySQL is a multi-threaded, multi-member SQL database management system with currently more than 10 million installations worldwide. MySQL runs as a server providing multi-member access to a number of databases.

Figure 2:
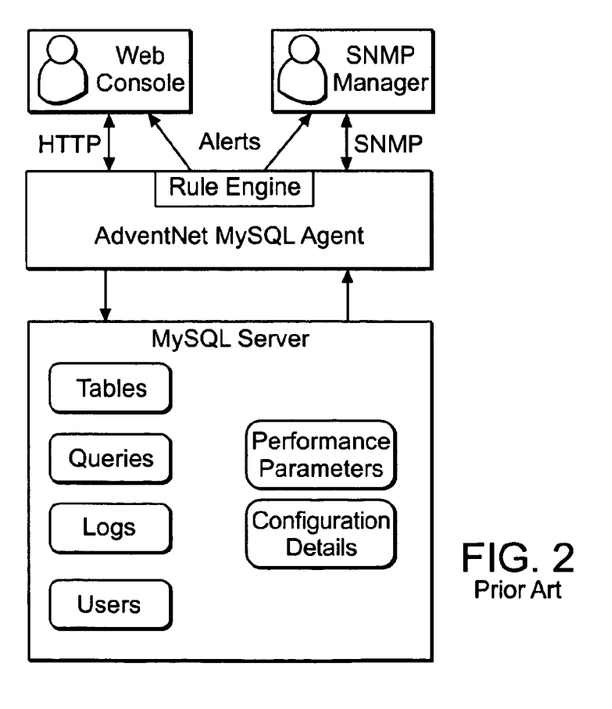
FIG. 2 depicts an overview of a MySQL database.

FIG. 2 depicts a simple overview of a typical MySQL database.

The servers employed in conjunction with the present invention will use the MySQL database system.

Web Server—The term "web server" is used to designate a computer and operating hardware system for the purpose of handling Internet traffic and requests. Like home computers, servers use operating system software (such as Linux) designated to run applications. Servers can also include additional applications that are used and bundled with the operating system such as spam blockers and anti-hacking software.

Server system applications can be divided among many server computers (such as server farms) over a wide range, thereby distributing the workload more evenly. Multiple servers can and are used for medium to heavy workloads, unattended, for a considerably length of time. Multiple servers are also usually in either a cabinet or rack mounted.

Dedicated high-load servers are used for specialized applications which are optimized for the needs of those servers. If a great deal of processing power is required in a server, there is a tendency to add more CPUs rather than increase the speed of a single CPU, again for reasons of reliability and redundancy. Many servers (such as those in server farms) use centralized air-conditioning used to keep servers temperatures.

Uninterruptible power supplies are also critical to maintain the servers in the event of a power failure. High-end servers also require powerful network connections to handle the large amounts of bandwidth that they typically receive and generate as they receive and reply to client requests. Servers run specific operating systems (such as Linux) that are designed specifically for them.

Figure 3:
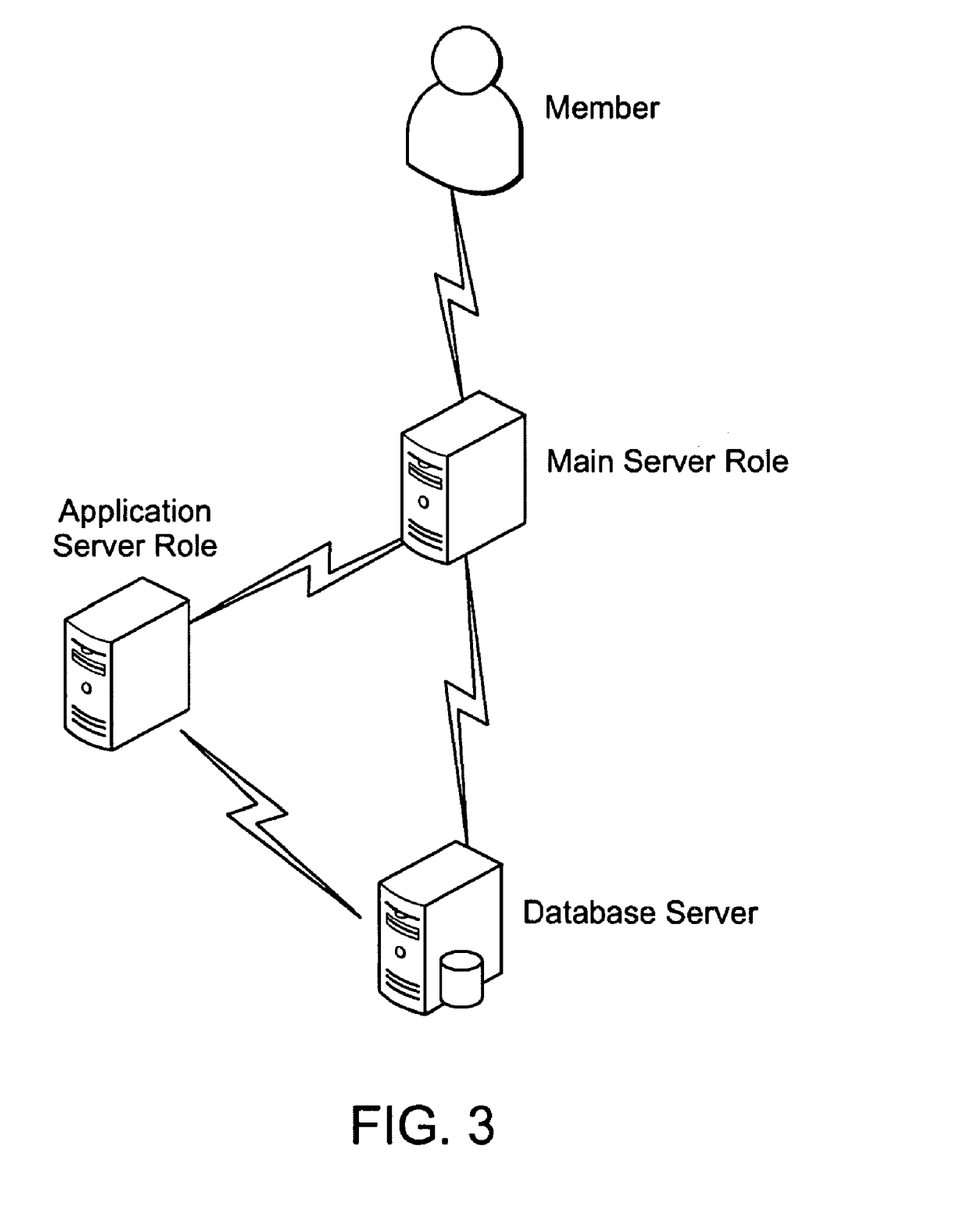
FIG. 3 depicts an overview of the server arrangement in one embodiment of the invention.

A basic overview of the server process with respect to the present invention is set forth in FIG. 3. As depicted in FIG. 3, the member initiates a query or seeks information, and that request is transmitted to the main server, which in turn interfaces with the application server and database server.

Server Farms—A server farm is a collection of computer servers maintained in clusters. The server farms have both a primary and backup servers, with the backup being utilized in case of primary server failure.

Server farms are generally co-located with the network switches and routers in order to enable communication between the different parts of the cluster and the members of the cluster. Server farms increasingly are being used instead of traditional mainframe computers used by large corporations.

Server farms need to consider such problems as redundancy, automatic failure, and can be reconfigured quickly if needed. Server farms streamline internal processing, by distributing the load between the individual servers expediting computing processes by harvesting the power of multiple servers.

Server farms rely on software that balances the load, and accomplishes the demand for processing power from individual servers, prioritizing the tasks and scheduling and rescheduling them depending on priority and demand that members put on the network.

Figure 4:
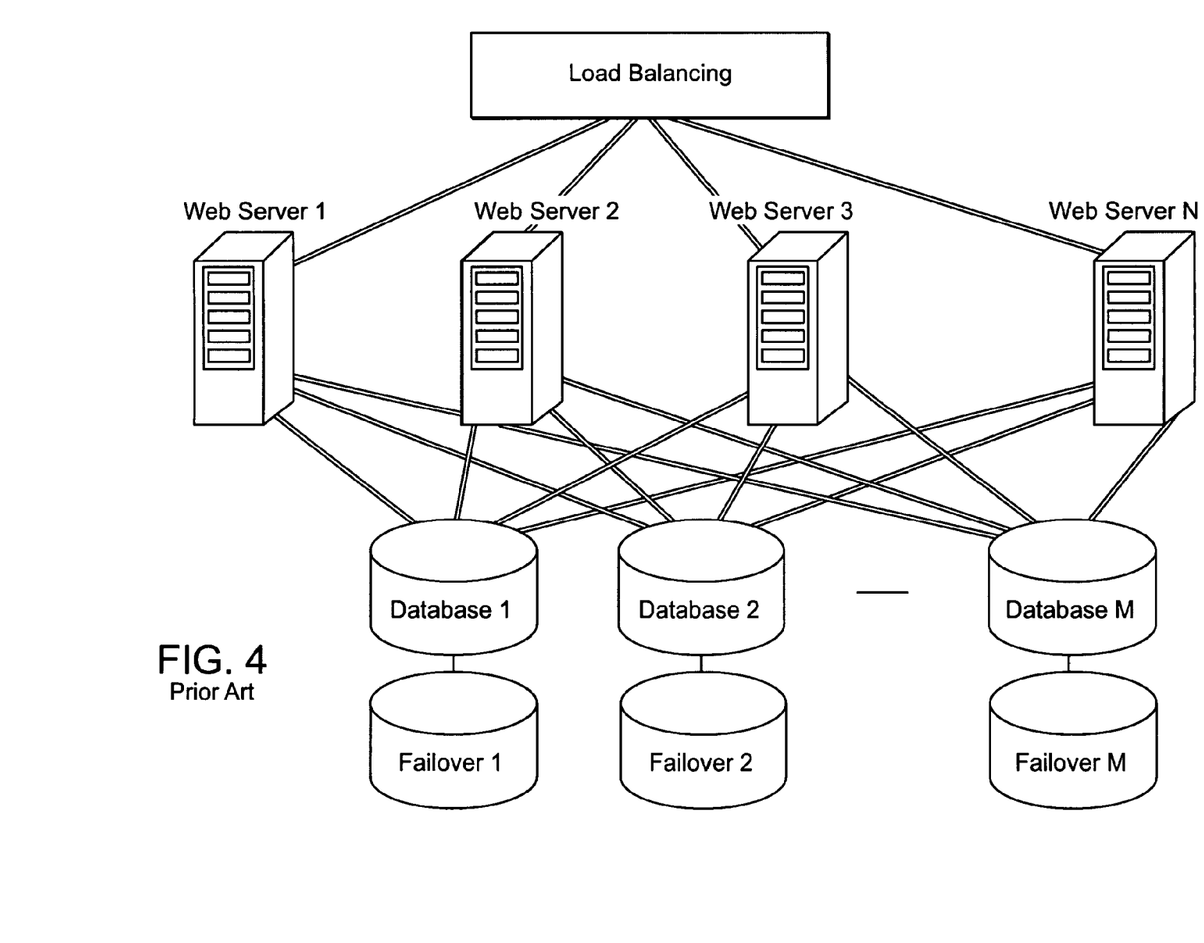
FIG. 4 depicts an overview of a server farm arrangement.

The schematic of a typical server farm is set forth in FIG. 4. In FIG. 4, web servers 1 to N are all connected to a load-balancing device and various databases. Each database is also connected to a failover device which acts as a backup for each respective database, in case of database failure.

Search Engine Bot—A search engine bot (also known as a web robot, spider or web crawler) is a program that automatically browses the Internet in a persistent and methodical process, cataloging the information and links that it comes across.

Search engines use these automated bots as a means of collecting and cataloging information, providing up-to-date data. Search engine bots are used to create and catalog a copy of the pages that are identified. Search engine bots can also be programmed to collect only specific pages, such as items a member can obtain by using their earned points, in connection with the present invention.

Search engine bots also collect URLs that are visited. When a search engine bot visits these URLs, it catalogs and indexes them accordingly. A search engine bot such as the search engine bot used in conjunction with the present invention must have a good cataloging policy, as noted in the previous sections, but it must also have an optimized architecture.

It is also important that the search engine bot have high-performance programming that can download thousands of merchant web pages efficiently. Search engine bots also require efficient algorithms and structure that are proprietary.

Figure 5:
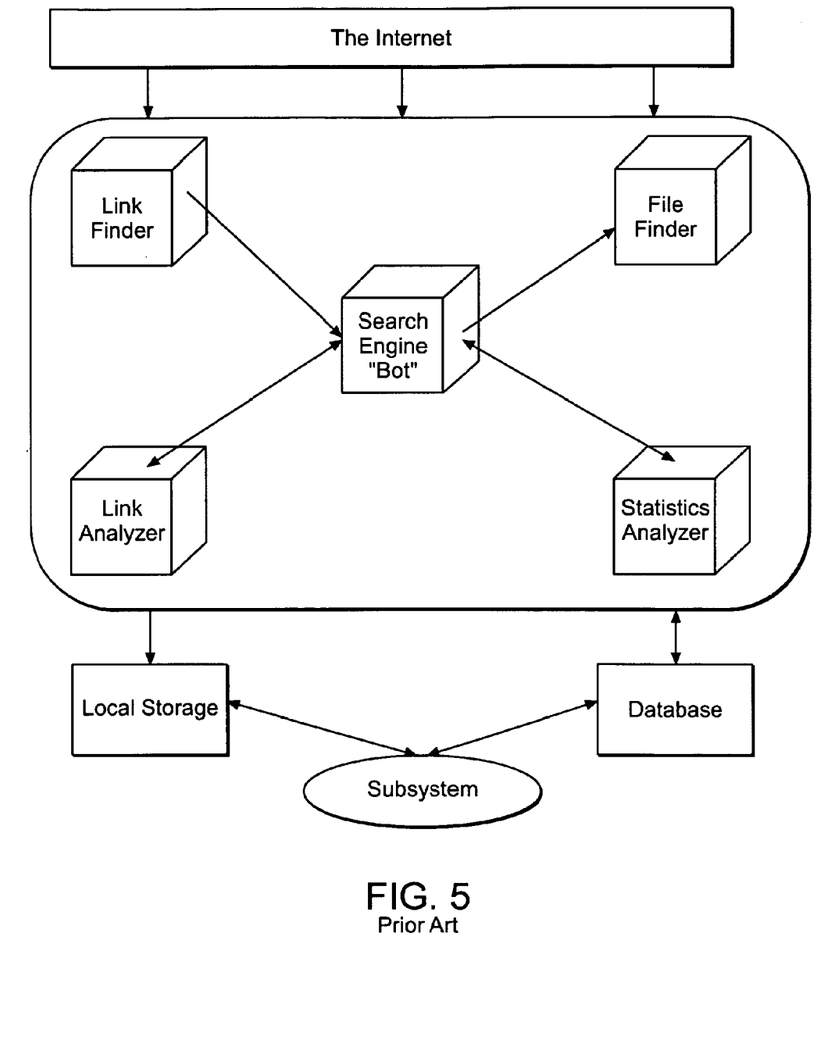
FIG. 5 depicts an overview of a search engine bot.

FIG. 5 depicts a simple overview of a system using a search engine bot.

Cache Memory—Cache memory is basically memory set aside for the collection of data. Caching is also considered as a "temporary storage" where popular information can be stored for easy access. When the information is stored in the cache, future searches (such as a search engine) can be accessed quickly and more cost-effectively by the cached copy rather than having to re-search for that same information. A cache is simply a block of memory set aside for temporary storage of the data likely to be used again. Web servers frequently use CPUs and hard drives for caching.

With respect to the present invention, when a member wishes to access information, the server first checks the server cache. If an entry can be found matching the requested information, the entry of that information is used instead of having the server go back and retrieve that information again, and is called a "cache hit."

The opposite situation is if the cache is queried and found not to contain information. This is known as a "cache miss." When a "cache miss" happens, the data retrieved usually inserted into the server cache, and now is ready for future access.

However, the cache has a limited amount of memory, and as new information is retrieved, the old and less used information is cleared to make room for the new data using the server's "replacement policy," which is usually predicated by the amount of random access memory ("RAM") the server has. RAM is a type of computer data storage using integrated circuits that allow for the stored information to be accessed in any order.

Sponsored Links—Sponsored links are paid advertisements located somewhere on a search engine results page. The ads are typically for products and services that are generally or very specifically related to the keywords in the member's search query. Search engines sponsored links help to generate revenue to pay for the bandwidth and databases. Sponsored links may be used in conjunction with the present invention to deliver useful links.

In a preferred embodiment of this invention, members enrolled in the rewards system can earn two types of points based upon time and accomplishment. All members will earn points based upon passive play time. Passive play earns members one (1) point per hour while logged into a game. Active play time earns player a predetermined number of points based upon how successful the player is while competing within the game. Active play points are only available from within certain games (e.g., games developed by a specific developer) to augment their existing code to enable tracking of performance by members.

Within the passive and active modes of play there are multiple incentive models offered to members to create greater interest, competition, and enrollment. Such incentive models include, but are not limited to:

Passive Mode:
  Members referring other gamers who enroll in the rewards system are awarded a one-time 500 point bonus for each new member enrolled.
  Members referring other gamers who enroll in the rewards system also earn passive points at a faster rate. Each time a new player is referred to a site offering the rewards system membership and actually enrolls in the program, the referring member's ability to earn passive points is increased by adding 0.04 points per hour for each new membership referral. Thus, for example, if a member refers four (4) new members to the rewards system, that referring member receives a one-time bonus of 2,000 passive points, and accrues passive points at a factor of 2 per hour. Should a referred member elect to unsubscribe from the rewards system, the referring member will lose the benefit of the added 0.04 points per hour.

Active Mode:
  In non-casino type games, members earn points based upon completing specific activities within a game.
  In competitive type games, members are given a minimum amount of "active player points" each month to use during play. Skilled players who beat other players will accrue the defeated player's active points risked during play.

Within certain games, "accomplishment points" will be awarded to members who complete certain predefined objectives. Accomplishment points are a one-time, large point bonus awarded to the member(s) successfully completing the objective within the game.

The rewards system of the present invention provides multiple incentives to the software gamer that are not offered elsewhere currently in the market. The elements inherent in the invention help the consumer build the confidence and trust that is requisite for any goods and services purchase. The website offers members looking to redeem their accrued points the ability to type in whatever product or service they desire into a database, and then choose through a list of available items sorted by price, or manufacturer, or model.

Various menus will allow members to fully examine and easily isolate their choices on a product comparative basis while providing the tools to help them refine what they need, and deliver visibility to the full complement of goods and services available online.

The website used in conjunction with the rewards system of the present invention acts as a consumer reference desk by providing tips, and a non-biased expert resource from which to obtain player and consumer feedback. The website furnishes members with real-time online quotes for available products and services based on member-selected criteria, and the actual cost to the member is based upon redeemable player points that have been accrued.

For example, in one embodiment a member has up to $50 of redeemable points accrued and wishes to acquire a queried item (e.g., car stereo, watch, jewelry, apparel, etc.) from the website. By typing in "car stereo" into the website's search feature, a list of all available car stereos from online aggregators or goods providers (e.g., Best Buy®, Amazon®, eBay®, etc.) is returned to the member. The member then chooses from the list the car stereo desired, and based upon accrued player points, the member is either advised that the member has enough points to receive the item at no charge, or the member is charged the difference of the item less the value of redeemable points. In this instance the member would receive the car stereo for $50 less than price available online.

Thus, the website converts the member's accrued passive and active points into virtual dollars that can be applied towards any online purchase. In addition:

The website does not limit prize choices by members or require contractual obligations with aggregators. Because the website will use web robots (spiders) to gather all available online goods and services from existing e-commerce sites, there is no need for forging contractual agreements with the aggregators and suppliers of the e-commerce sites to provide members with an unlimited inventory of goods and services available at the current selling price less the member's accrued point total.

The product for the member is purchased directly from the source. Thus, the fear that a member's point total will be artificially exhausted because the inventory of available prizes will be limited and the points necessary to acquire products at inflated prices disappears. Members can compare the prices listed in the website for prizes against the prices listed on any e-commerce site to conclude that the website is offering the best possible price and product anywhere on the Internet. This avoids the need to replicate that which is already available and working well, and avoids these duplicative costs which should not be included twice in the product's pricing.

Figure 6:
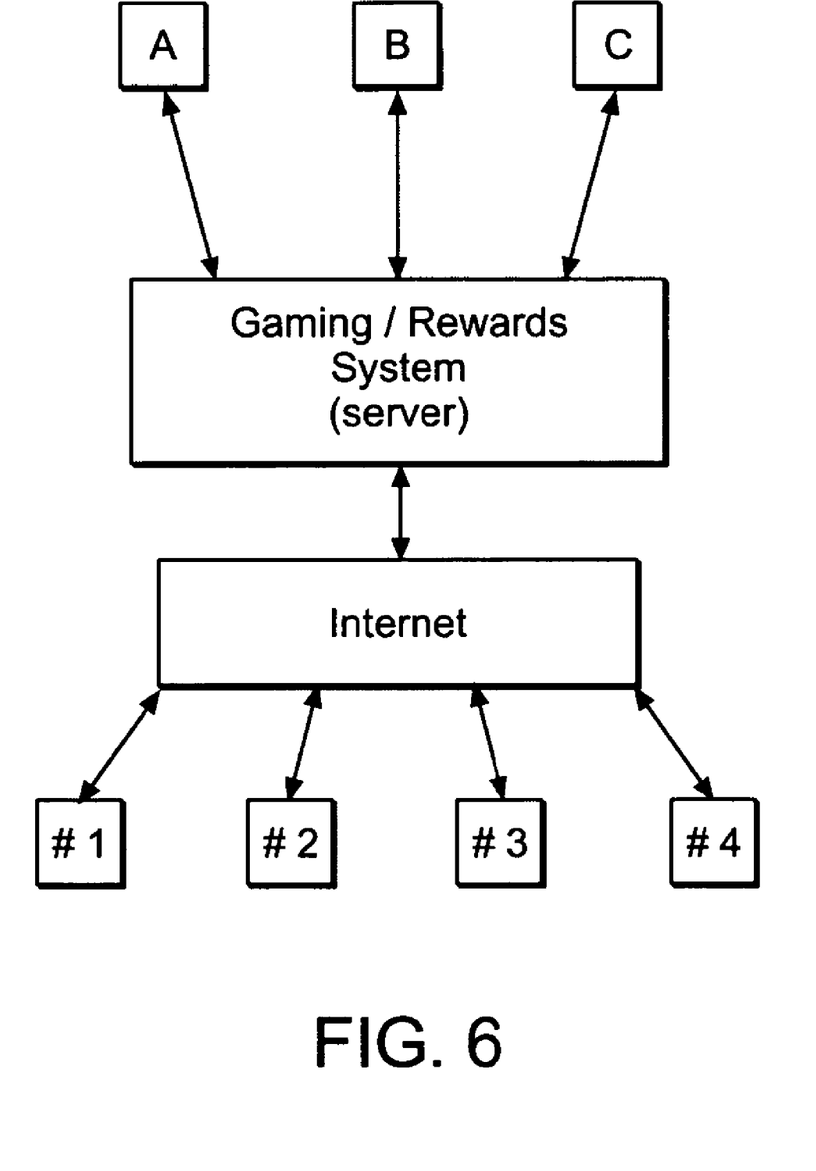
FIG. 6 depicts a schematic of one embodiment of this invention.

FIG. 6 depicts a schematic of one embodiment of this invention. As shown in FIG. 6, multiple members (i.e., Member #1, Member #2, Member #3 and Member #4) are using either a commercially available videogame platform (e.g., PLAYSTATION 3®, XBOX® or Wii®) or a personal computer (PC) or Macintosh® computer to engage in interactive gaming with one another via the Internet. In addition, each member is connected via the Internet to the gaming and rewards system of the present invention via servers and associated software and hardware, which in turn are connected via the Internet to various goods providers A, B and C (e.g., Best Buy®, Amazon®, eBay®). The rewards system of this invention resides in the servers. As described above, members may use the rewards system to accumulate points, and to redeem points for desired goods through the rewards system.

In a particularly preferred embodiment, the architecture of the rewards system relies on a number of key components to build the overall solution. The primary pieces of the infrastructure include the following features and/or components:

Member Rewards Agent—The Member Rewards Agent runs directly on various devices, including gaming consoles. The Agent monitors the member's activity, reports usage data, and provides access to the member's reward information. All communication is secured via SSL.

Web Front End—The Web Front End provides for the member's registering or performing account lookup/management over the Internet. All communication is secured via SSL.

Web Services Tier—The Web Services Tier is the primary application interface for interacting with the member. The Web Services Tier communicates securely via SSL with all external and internal systems, and also communicates directly to the Member Rewards Agent and the Game Integration Framework (discussed below). In addition, this tier communicates with external networks such as third-party gaming networks and redemption networks.

Application Servers—The Application Servers have all of the application level business logic and act as a broker from the Web Front End tiers to the back end databases. The application servers are separated from both the web and database tiers by network security including firewalls.

Database Services—The database used in connection with the rewards system of this invention is designed as a federated database to increase the level of security over sensitive member data. The sensitive data, including real name, payment information, and address are separated from the common account information such as member name and game usage. The sensitive database is further protected by a network firewall.

Network Security—Firewalls are used to separate the tiers of the application to increase security and reduce any risk of accidental data loss. In addition to traditional network firewalls, web application firewalls will be leveraged to protect the web site and Web Services Tier from Internet-based attacks.

Game Integration Framework—The Game Integration Framework provides a set of tools that games can use to integrate their game experience more fully with the rewards system of this invention.

Gaming Networks—The rewards system of this invention will integrate with third-party networks (e.g., Xbox Live®, etc.) to obtain member usage data.

Redemption Network—The Redemption Network will provide the actual product redemption opportunities and handle fulfillment of the member's orders.

Some of the above-designed components and/or features are described below in greater detail:

Member Rewards Agent

The Member Rewards Agent is software developed as appropriate for each target platform. The functionality and availability of the agent varies depending on the platform. The Agent monitors various activity, reports usage data, and provides access to the member's reward information. The primary purpose of the agent is to monitor the member's gaming activity to credit the member for her gaming activity. The agent has three levels of integration with running games. The levels of interaction are monitoring, hosted, and full integration.

The lowest and default level of interaction is to monitor the member's activity and track what games are being played on the system and for how long. This will rely on basic levels of system level calls to provide application data such as the WindowsEnum API function in Windows®. This level of monitoring is available and fairly robust on the desktop platforms. All of the current console platforms rely on an underlying operating system.

The second level of interaction is via a hosted solution. This level of interaction relies on the member accessing the rewards system website and executing code from the website that enables some level of member monitoring. Depending on the client platform and the level of access the member has, this could range from an ActiveX® control to simple Javascript® code. In cases where a fuller feature code is distributed (such as an ActiveX® control) the level of monitoring and detail will be similar to the monitoring level. For other platforms the monitoring would only apply to web-based games that could be launched from within the same browser as the monitoring code.

The highest level of interaction is a combination of the client agent receiving data directly from the member's running game(s) via the Game Integration Framework. This will allow for the client agent to receive more complete data directly to and from the individual games that offer the highest level of integration.

The member will have the ability to turn the monitoring client on and off as well as to block the client from reporting usage of some games or during certain hours if desired. The desktop client may work from behind corporate firewalls and through Internet proxies.

In addition, the monitoring capabilities of the Agent permits the member to view current information on their account including activity logs, marketing messaging, and other communications to/from the rewards system.

The Agent relies on the device's Internet connection to transmit data. The Agent has an offline caching mode to store usage data locally when the member is playing games while not connected to the Internet. For mobile devices without direct connectivity, such as the iPod®, the device's cached information is synced via the device's desktop connection.

All communications to/from the Agent are encrypted. The communication is made via SOAP or similar protocols depending on each individual platform. All of the communications are initiated by the Agent. The agent itself performs regular "check in" operations to pick up updates to the Agent code base or pick up any other communications directed towards the end member.

Web Front End

The Web Front End is a traditional member facing web site experience. The Web Front End is primarily for member registration and account management. In addition all of the client agents are available via the Web Front End, especially the hosted client option. The Web Front End integrates with advertising engines to allow for targeted advertising opportunities to the target gaming members. The Web Front End has many interfaces to be compatible with the range of browsing experiences including desktop browsers such Internet Explorer®, Safari®, Firefox®, and Chrome® as well as the embedded browsers available on the gaming consoles and mobile devices.

The Web Front End also provides the access point to other content such as the "Patriots of Freedom" and "Nuclear Jihad" games discussed herein. A variety of standard web-based member interactive games are also available for use and rewards points accumulation.

The Web Front End also offers integration with online gaming networks such as Xbox Live® and MSN Zone® to provide a more integrated online gaming experience for gamers leveraging these online services. In addition the website directly integrates with the redemption network(s), to permit the member to do redemption directly from the rewards system experience while still accessing all of the content from the redemption networks.

The Web Front End also contains social networking features to allow members to build their gaming profiles online. The rewards system is designed to become the gamer's "home" and permits them to consolidate their gaming achievements and presences from across multiple gaming platforms. The Web Front End may also be adapted for multi-language support.

Web Services Tier

The Web Services Tier provides a services level interface to the rewards system. The Web Services Tier has core services interfaced to the rewards system as well as services for integration with third-party networks.

The core services provide application level functionality for all of the member authentication, game usage reporting, account information, and member competition. The web services are used by the Member Rewards Agent and make up the back end of the Game Integration Framework (as discussed below).

The Web Services Tier also provides the access layer for all third party integrations including gaming networks and redemption networks.

Application Servers

The Application Servers contain all of the core business logic and act as the broker between the Web Front Ends and the back end databases. The Application Servers are the only tier of the application that has direct access to the database services.

The application servers are also responsible for back end billing and marketing services including outbound communications to the client agents. The Application Server performs all back end batch processing and reporting preparation.

Database Services

The Database Services provide all of the data for application in a centralized set of data stores. To maximize the security of member's private data, the database is federated across two databases with most of the application calls only having access to the primary database containing member account and usage information. All confidential client information is stored in a separate database that is only available to specific application calls and leverages separate authentication credentials from the primary database.

Network Security

Security is a key element of all components, as it is critical to maintain member security. In addition to the security embedded at each tier, network security provides additional protection. Each of the tiers is separated by a network firewall. In conjunction with the network firewalls, the web front end and web services tier are protected by a web application firewall. The web application firewall increases security by opening up the HTTP traffic that is passed through the firewall and inspecting the packets, including the ability to have visibility into the SSL traffic.

Game Integration Framework

The Game Integration Framework is a toolkit to allow third-party games to integrate directly with the system of this invention. The framework consists of a set of back end web services that can be accessed directly by game publishers as well as more customized versions of the framework for each platform. As an example, the framework may be developed using XNA® for the Xbox 360® and Windows® platforms.

The framework allows the game to fully integrate with the rewards system, including logging member activity, rewarding the member with "bonus" points, checking member balances, and allowing for interactive competition with points at risk.

The framework will include detection capabilities for a local agent to interact with the local agent in addition to interacting directly with the Web Services Tier.

Gaming Networks

The system of this invention also may integrate directly with online gaming networks such as Xbox®, Playstation Home®, MSN Arcade®, as well as online gaming providers such as World of Warcraft®. This integration will allow the member to gain credit for playing on these 3rd party networks without having to install the agent on the target devices.

Redemption Network

The system of this invention will integrate with third-party networks to allow members to leverage their earned points for rewards. The details of the integration will vary depending on each redemption network as the system will need to comply with the existing network's connectivity methods.

Figure 7:
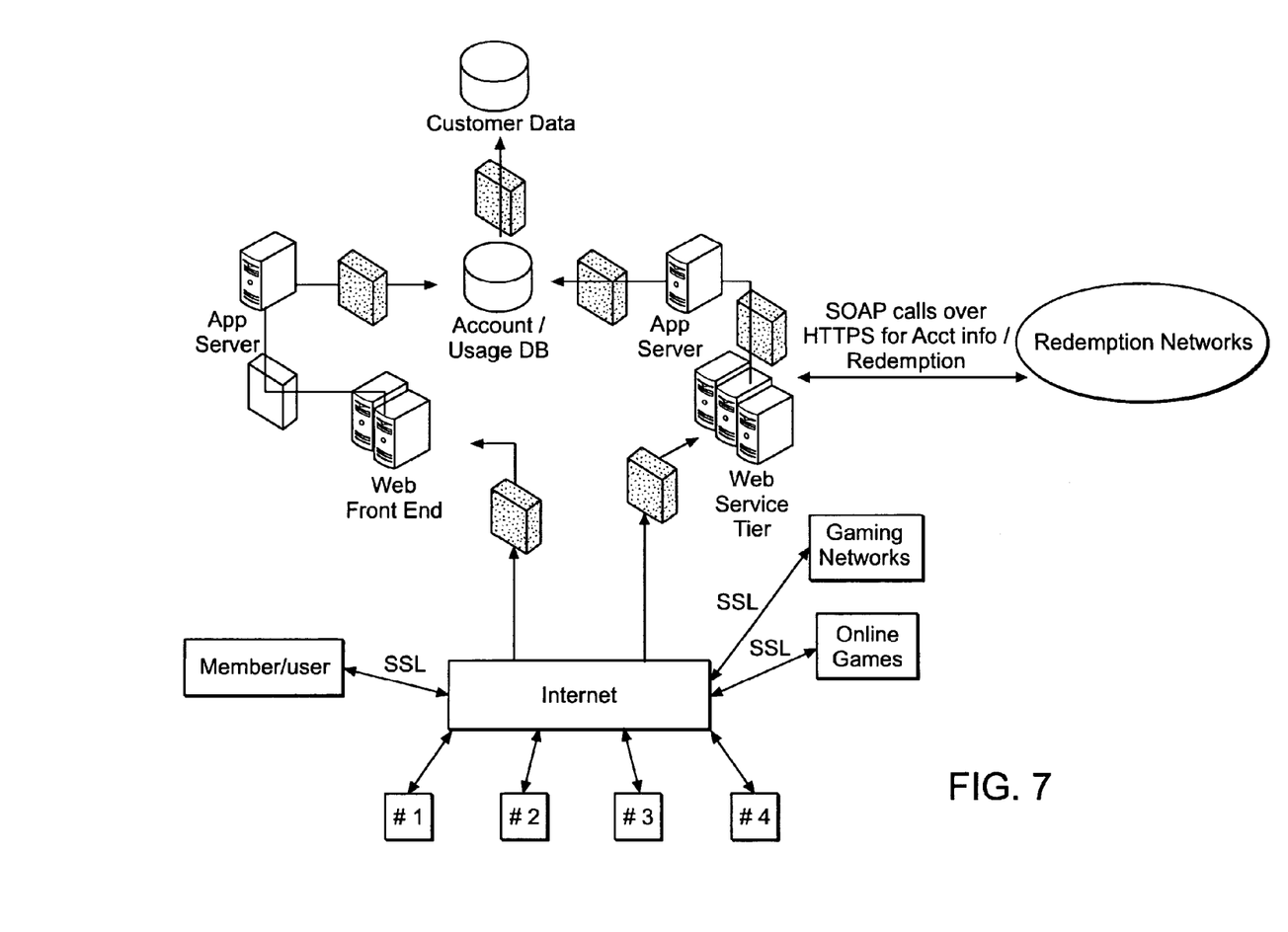
FIG. 7 depicts a schematic of another embodiment of this invention.

A schematic of another embodiment of the invention is set forth in FIG. 7. As shown in FIG. 7, multiple Member Rewards Agents (i.e., Agent #1, Agent #2, Agent #3 and Agent #4) are commercially available videogame platforms (e.g., PLAYSTATION 3®, XBOX® or Wii®), a personal computer (PC) or Macintosh® computer, mobile/cellular phone or PDA to engage in interactive gaming with one another via the Internet. The Agents communicate via SOAP over HTTPS. In addition, various gaming networks (e.g., XBOX Live®, PLAYSTATION Network®, MSN Zone®, WOW®) interface through the Internet via SSL with the Agents. A member/user is interconnected (via SSL) to the Internet and thereby connected to the gaming and rewards systems of this invention. More particularly, the member/user interconnects via the Internet to the Web Front End which contains the Member/user registration and account information and manages this information. The Web Front End is further interconnected to an applications server which performs various functions and transmits information to an Account/Usage database. Similarly, the various Agents are interconnected via the internet to the Web Service Tier and another applications server which performs various functions and provides additional information to the Account/Usage database. The Account/Usage database may provide additional customer data as required. The Web Service Tier also is in communication (via SOAP calls over HTTPS) with the various redemption networks/goods providers (e.g., Best Buy®, Amazon®, eBay®). As described above, members may use the rewards system of this invention to accumulate points, and to redeem points for desired goods through the rewards system via the system.

Unlike other types of programs, the rewards system of the present invention will not offer a limited inventory that requires members to give advance notice, adhere to blackout dates and restrictions, etc. Members can take advantage of their accrued points at any time, night or day, whenever they choose. Additionally, unlike other membership groups, members will not be required to log a predetermined number of hours per month (or year) to be eligible to use their accrued points.

The rewards system of the present invention offers members the ability to earn virtual dollars that can be used in conjunction with completing almost any online purchase.

The shopping service used in conjunction with the rewards system of this invention will offer members the ability to shop in multiple dimensions, which is unique in its comparative power. Members will have the functionality, ability to select the product desired, and the overall experience that is the norm in other Internet product executions. The member can identify her needs, research various products, read buyer reviews regarding a product or company, perform a complete comparative value analysis and choose the product or service that best satisfies her criteria. At that point, the member will be introduced to everything available on the Internet at a discount, while still enjoying the full benefits of the existing sales and fulfillment mechanisms of the aggregator/manufacturer/distributor/wholesaler/retailer. Unlike existing Internet shopping services, the website used in conjunction with the rewards system of this invention will not be limited to a few companies that are representative of a category but instead will provide access to virtually the entire market, although this feature can be limited for specific "white labeling" applications.

The following features are exemplary of the invention:

Maintain a Broad and Deep Product Suite—One objective is to provide members with a comprehensive shopping solution for their needs. The depth of the product offering will be established by aggressively using web robots (spiders) to scour the Internet based upon keyword search to yield the widest array of potential matches possible (sortable by price, manufacturer, and model). Providing a full portfolio of meaningful choices will increase the attractiveness of the rewards system of the present invention, and, therefore, the value of membership enrollment to the gamer. Membership enrollment will increase in two ways: first, the additive power of each company's competitive price structure; and second, the gamer will stop shopping because they have the confidence that they shopped the whole marketplace to find the desired item.

Technological Integration with Other Select Companies— The website used in conjunction with the rewards system of the present invention will integrate fully with any company's e-commerce page. By integrating with any product or service available online, superior selection and acquisition efficiencies can be achieved that present a unique and distinctive offering to members. Doing so will not only allow members to obtain premium goods and services online, but also reduce duplicate information entry, speed the purchase process, improve pricing information and enhance customer satisfaction.

Pursue White Label License Agreements—The business-to-business aspects of the platform can be leveraged further by technology-licensing arrangements with third parties. Under such arrangements, a fee would be obtained for the use of the rewards system of the present invention to white label third-party sites and listing of their products (and/or services) on the website used in conjunction with the rewards system of the present invention. The technology can be implemented for a variety of third-party sources, from online retailers to large computer manufacturers. Such an initiative offers the potential for an additional source of revenue, as well as enhanced development of the e-brand. The platform has unusual appeal to large affinity groups and other entities that would like to offer their good and services directly to software gaming. A white label service allows third parties to deploy the platform on a selective basis. The third party can address specific target market to a clearly defined niche market with supporting demographics that clearly indicate sweet spots and allow for key product placement.

Another feature is that the rewards system of this invention will enable the transfer of highly filtered data from e-commerce pages to the website, allowing the charging of a premium for any white labeling agreement fee.

The present invention will benefit members by: (i) providing access to an unlimited choice of online goods and services; (ii) providing informative, independently evaluated, comparative information that helps members to make more informed purchasing decisions, and (iii) making the online shopping experience less burdensome, more convenient, and always at a discount.

The benefits to consumers include:

One-Stop Comparison Shopping—The platform allows members to evaluate multiple goods and services side-by-side. Like a search engine, the present invention sifts through the market and brings back the results for inspection and refinement. Members are able to enjoy comparative, competitive quoting from a breadth of online entities and purchase channels previously unavailable from any membership rewards service. For the first time, the pool of available online goods and services are reflective of the market in its entirety, as opposed to a select group of companies willing to enter into an agreement with a specific member base. Members can search and shop almost the entire Internet in one simple and easy experience.

Reduced Search Cost and Barriers to Purchase—By providing all of the necessary information on one platform, the search costs and barriers-to-purchase consumers normally face is drastically reduced. The site contains plain language descriptions of products augmented with actual purchasers' comments, reviews, and rankings. Members obtain highly relevant insights about customer satisfaction, benefits, and manufacturers. This independent community validates the objectivity of the offering and creates the confidence for informed purchasing. Currently, the perceived search costs and aggravation associated with diligent research often outweigh the potential price and value savings consumers might realize. The platform significantly lowers these search costs, thereby allowing consumers to reap the appropriate value from their online purchases.

Comprehensive, Easy-to-Use Information—Another feature of the present invention is the delivery of this content "in context" during the search discovery process. Access is offered to the most comprehensive database of information on products and services available. With the click of a mouse, members can access educational materials on products and services, including answers to frequently asked questions, a dictionary, informative articles, and product ratings. The website used in conjunction with the present invention is a nexus of non-biased insights and information on goods and services. Members are able to comment on, evaluate, and review the products, services, and companies across several criteria. The ultimate buying power is in the hands of the member: complete market access with tools, guidance and delivery choices designed to satisfy all needs at a discounted price.

Convenience and Control—The rewards system of the present invention provides greater convenience to members by allowing them to access and review information and prices at any time. A member's request is fulfilled seamlessly and automatically through multiple heuristic algorithms and MySQL database, thereby minimizing the time and effort required to find a specific item and consummate a transaction. Search results are organized in an easy-to-use format and provide members with interactive website features to assist them in analyzing the product or service that is most suitable for their needs. For instance, products and services are tagged with a link to relevant information regarding that item, educating the member about that product or service, and giving expert recommendations.

Viral Networking and Co-opting of Players' Rewards Points—The Patriots of Freedom scenario (discussed below) represents the first-ever truly collaborative massively multi-player online role-playing ("MMORPG") in which an added incentive is tied to how proficient members excel within the confines of the game. Members who build the bigger and better network of players gain access to a greater prize pool potential, and can earn redeemable rewards in a shorter time frame. Aside from the usual excitement associated with playing an excellent MMORPG, converting the online gaming experiences into tangible assets causes members to have a more vested interest in the games they play.

The search engine used in conjunction with the present invention is an intelligent search engine designed to query the Internet for the items desired by people who belong to the rewards system of the present invention, and allow members to then shop for and purchase items by using their earned points. The search engine used in conjunction with the present invention works similar other search engines, in that both work using players input and heuristic algorithms to find items that a player wishes to purchase using their earned points.

The search engine used in conjunction with the present invention works by retaining information on popular searches both current and previous. The search engine used in conjunction with the present invention uses algorithms which work with an indexed database on its web server farms. The search engine used in conjunction with the present invention also works by using customized search "robots" (also known as "web bots", "spiders", or "web crawlers") which traverse across the Internet cataloging merchant's web pages following the links along the way. The contents of the merchant's pages are scanned to determine how it should be indexed and then stored in a database. High traffic merchant pages are also cached. The purpose of caching this information is that it enables the search engine used in conjunction with the present invention to search its own database index faster and more easily, while using less bandwidth. When a member inputs her query into the search engine, the engine searches its own database and provides a listing of items searched for.

The search engine then provides an organized list of items to the member according to their rank. In one embodiment, in addition to the listing of searched-for items, the search engine on the left side of the member's browser, on the right side is a listing of sponsored links. Sponsored links (e.g., white labeling) are merchants that have paid to have their items appear on the search engine along side search results, which are based on keywords entered into the search engine, and generates money every time a member clicks on one of those sponsored links. Members can also rate merchants on things such as responsiveness in regard to their shipping and overall customer service. The search engine mission is to enable members to quickly and easily and buy anything sold by virtually anyone, anywhere by redeeming their points.

The primary source of revenue derived from the present invention will be the monthly and/or year membership enrollment fees that enable gamers (i.e., members) to accrue points in exchange for time spent playing video games. Members may range from the novice to the veteran gamer, all of whom would enjoy added incentives for engaging in playing video and computer games.

Any item or service that can be purchased online will be part of the inventory of products offered, with more expensive items (or services) requiring greater points to obtain.

Members enrolled with the reward system employed in this invention will be showcased on a website based upon most point accrued, most hours spent online, and most points earned for the day. Members will be able to enjoy comparative, competitive scoring from a breadth of software games and generate an online reputation hitherto unavailable within the software gaming industry. For the first time, the pool of software gamers and their rankings will be reflective of the market in its entirety as opposed to a select group of players within the confines of a specific game. In one embodiment of the invention, members will compete for the top spot and top prizes over their competitors.

In one embodiment of the invention, member dossiers will allow other members to pick and choose which members they would like to forge alliances with, and establish the best teams for obtaining the most points possible. Member dossiers give members metrics by which to gauge the true performance and ability of other members. All member dossiers are kept completely anonymous and access to any member personal information (IP Address, e-mail address, and any other pertinent data) is unavailable and restricted unless expressly released by the member.

Members are able to compare scores, ranked evaluations of specific members and their player attributes, as well as game reviews and commentary from other members and gaming experts. Members are also able to obtain highly relevant insights as to customer satisfaction, game quality, and tips and tricks from other members. This independent community objectively validates the gaming software offerings and creates the confidence for informed purchasing.

White labeling of the invention for affinity sponsors like PC manufacturers, peripheral and accessories companies, etc., means they can offer choice within a readily accessible pre-established target audience. Also, the platform provides a springboard for targeted efforts directed at specific percentage of the population; for example, the high ranking players are more apt to beta test and purchase (or redeem points using the rewards system of this invention for) higher-end products.

There currently is no existing structure in the software gaming industry to truly offer gamers compensation for their time playing any video game. The reward system of this invention offers compensation to members in exchange for the hours spent competing.

In one embodiment of this invention, the redemption of points can be conducted real-time during game play, or online by logging onto a website.

Creating an interface (or software utility) that members will receive via e-mail and then install locally on a personal computer or PDA or mobile phone enables members to use the invention and verify and track the hours spent playing software games. Additionally, in one embodiment of the invention, members can use this software to enable communication between various videogame systems (e.g., PLAYSTATION 3®, XBOX® or Wii®). This interface transmits all the pertinent gaming data to a central data recipient, and allows verification of every member's playing time and points accrued.

By tying tangible accolades that are accumulated based upon play within the software game, the desire of members to compete and play well within software games will be enhanced and thus lead to further enrollment in the rewards system of this invention. Thus a virtual marketplace within a community of millions of gamers will be created which will enable members to acquire goods and services based solely upon the act of playing a video game.

Merchant ratings allow members to easily provide input about their purchasing experience in an easy to read format that provides useful feedback to both the site and to the member.

Member reviews feature the following components:
Easy to view star ratings which provide a simple, visual way for members to rate and comment on the overall quality of their business purchase.
Members can easily select from a scale of 1 to 5 stars (with 5 stars being the highest rating).
These ratings and comments give members the opportunity to describe their purchasing experience, as well as shipping and delivery experience in their own words.
Comments also provide the details behind the star ratings that they choose.
Overall rating scores are the average number of stars given by members who have posted ratings from the merchant. Merchant rating stars are displayed for merchants with 2 or more reviews within the past 12 months. Merchant ratings are also checked for accuracy in order to prevent any abuse resulting from a fraudulent review.

In another embodiment of this invention, downloadable software is provided that allows members to interface with servers used in conjunction with the present invention to monitor their game playing for the purpose of maintaining (passive and active) point totals. These points are then redeemed by members for discounts on e-commerce-based products or services.

The downloadable software is easily installed on the member's computer and allows verifiable tracking and accounting of member points that have been accrued or awarded.

This software can be installed on most computer operating systems, and is downloadable from the servers and the software package is then installed onto the member's computer.

The software is written in the C++ mid-level programming language, and the download utility software will be certified to contain no spyware, or any other types of malicious software or scripts. C++ comprises a combination of both high and low-level programming language features, and is the preferred programming for this level of utility.

The software itself will not only integrate with the member's computer, but will also integrate with wired and wireless routers so that outside computer controlled devices, such as MICROSOFT XBOX®, XBOX 360® consoles, NINTENDO Wii® console and SONY PS3®. The software will control the point distribution and reconciliation for the MAC and PC based games, and well as present an entrée into offering the present invention into the console-based gaming industry.

All of the above listed consoles (except for the original XBOX®) represent the seventh generation of home gaming consoles, and these consoles represent the ability to connect directly to the Internet via an Ethernet connection feature.

An Ethernet connection is a collection of computer network technologies for local area networks (LANs). Through the use of Ethernet connections in their gaming consoles, MICROSOFT®, SONY® and NINTENDO® have presented the owners of their home consoles with a myriad of online features.

These features include, but not limited to:
Online game playing capabilities,
Online member profiles,
Direct access to online game forums,
Live online arcades,
Friend lists, instant messaging, voice, video, picture, and data file, and;
Online marketplaces (which allow players to purchase games, download demos, music, videos, etc.)

Besides being able to directly access the Internet using broadband services (cable, DSL and satellite), the Ethernet capabilities also allow for connection to members computers, through either a direct Ethernet connection straight into the computer, or a more popular configuration using either a wired or wireless router.

Through the use of a router, video game consoles are able to create a network that includes their gaming consoles, computers, entertainment centers (televisions, DVD players, surround sound systems, etc.), and other controlled devices.

The software will contain a graphical member interface ("GUI"), for installation, use and removal if so desired. A graphical member interface or GUI is a type of member interface that allows Players' Rewards members to interact using their computer, computer controlled device (XBOX®, NINTENDO Wii®, and PS3®) with the Players' Rewards servers.

A GUI consists of image icons, visual cues or image elements which enable the player to be able to easily navigate the software and its attendant features. The icons and images are used in conjunction with text, labels to fully represent the information and actions available to the member. Creating the visual image composition and behavior control of GUI is a crucial part of software application programming. The GUI main purpose is to enhance the efficiency and ease the usability for the members. Besides English, the GUI will also be available in modern high use languages such as Spanish, French, German, etc.

After software installation, the member can access the GUI simply by clicking on the appropriate icon. The GUI is a virtual shopping mall, designed to allow members to purchase a vast assortment of items found on a shopping portal which relies on the content harvested by the search engine employed in this invention.

The shopping portal is the main page (index) on the Internet that functions as a point of access and gateway for diverse sources in an easy to understand way. Those sources include but not limited to, information such as the number of points a member has collected, points lost, and points redeemed towards the purchase of online products and services.

The search engine will be integrated within a web portal to assist members in locating and acquiring items they desire. Merchant advertising (part of the White Labeling) can be incorporated into the search engine portal.

Within the portal used in conjunction with the present invention, members can access merchant ratings, submit comments, and review other member's commentary on merchants they have used points to redeem products and/or service from.

The index page can be dynamically updated, and give members real time access to their accounts. While the portal index page will be written in dynamic Internet languages (such as PHP, HTML, XLS, etc.), the utility itself is software that monitors the members game playing and forwards that information to the online database, where it can be recorded, analyzed and the appropriate points are then rewarded and their account updated and displayed to the member via the portal page.

Membership requires that a player have an account. It is this account that allows their play to be tracked and reward points awarded, via the downloadable software integrated with the online database.

The method of point distribution of this invention uses a system of checks and balances to ensure that a member's point total (active and passive) are valid, correct, and verifiable.

Every point issued to members (active and passive modes) is treated like individual assets, and each assigned point is issued a unique record number that incorporates a date and time stamp that is down to one ten thousand of a second.

Within the system every member is assigned a unique membership that is kept internally on the servers. Each time a monthly membership fee is collected, 2,000 active playing points are awarded to the member whose credit card has been successfully charged. The financial server will record the transaction and log the financial record onto the member's unique ID number. The financial server will also send a request to the server dedicated to tracking and assigning member points. The server dedicated to auditing, tracking, and verifying points will generate and assign 2,000 points into the member's point total.

Passive points are issued in this same manner, and additional safeguards can be implemented to identify any potential threat to our system, which include but are not limited to: (i) at no time should any two points contain the same ID record; and (ii) there should never be more total points in play than exceed a threshold of 39% of the total funds collected.

The following examples of the invention are merely illustrative of details of the invention, and are not meant to be limiting in any way.

Example 1

Patriots of Freedom Game

The following is a basic outline of the game entitled "The Patriots of Freedom," which may be employed in one embodiment of this invention.

The setting is the present-day United States. After the attacks of Sep. 11, 2001, terrorism affects many nations and spreads with each passing day. If left unchecked dark and sinister forces will eventually consume the entire planet. The player begins his virtual life as a patriot by enlisting in one of the four branches of the U.S. military:

Army personnel report to Fort Bragg, North Carolina
Navy personnel report to Indian Head NSWC, Maryland
Air Force personnel report to Edwards AFB, California
Marines report to Camp Lejeune MCB, North Carolina Once enlisted, the player begins basic training to familiarize herself with how to control and operate the patriot. All experiences within the game will depend on which branch is chosen to serve in, how the player comports herself within the game, and how well the player can adapt to the changing environment.

The Patriots of Freedom (POF) represents the next wave of MMORPG video games. POF operates within the hierarchical structure of the U.S. military incorporating Real Time Play ("RTP") that begins as a First Person Shooter ("FPS") and evolves in complexity as the patriot begins to increase in rank, skill, character, knowledge. The patriot's experience begins by receiving direction and orders from higher ranking patriots and as higher ranks are obtained, transitioning begins from strictly a FPS towards directing and commanding the lower ranking patriots.

Individual patriots are encouraged to band together and form the best squad possible based upon player dossiers.

Individual Patriot—The player will go through basic training to learn how to operate the Patriot.

Squad—9 to 10 Patriots. Typically commanded by a sergeant or staff sergeant, a squad or section is the smallest element in the Army structure, and its size is dependent on its function.

Platoon—16 to 44 Patriots. A platoon is led by a lieutenant with an NCO as second in command, and consists of two to four squads or sections.

Company—62 to 190 Patriots. Three to five platoons form a company, which is commanded by a captain with a first sergeant as the commander's principle NCO assistant. An artillery unit of equivalent size is called a battery, and a comparable armored or air cavalry unit is called a troop.

Battalion—300 to 1,000 Patriots. Four to six companies make up a battalion, which is normally commanded by a lieutenant colonel with a command sergeant major as principle NCO assistant. A battalion is capable of independent operations of limited duration and scope. An armored or air cavalry unit of equivalent size is called a squadron.

Brigade—3,000 to 5,000 Patriots. A brigade headquarters commands the tactical operation of two to five organic or attached combat battalions. Normally commanded by a colonel with a command sergeant major as senior NCO, brigades are employed on independent or semi-independent operations. Armored cavalry, ranger and Special Forces units these sizes are categorized as regiments or groups.

Division—10,000 to 15,000 Patriots. Usually consisting of three brigade-sized elements and commanded by a major general, divisions are numbered and assigned missions based on their structures. The division performs major tactical operations for the corps and can conduct sustained battles and engagements.

Corps—20,000 to 45,000 Patriots. Two to five divisions constitute a corps, which is typically commanded by a lieutenant general. As the deployable level of command required to synchronize and sustain combat operations, the corps provides the framework for multi-national operations.

Army—50,000+ Patriots. Typically commanded by a lieutenant general or higher, an army combines two or more corps. A theater army is the ranking Army component in a unified command, and it has operational and support responsibilities that are assigned by the theater commander in chief. The commander in chief and theater army commander may order formation of a field army to direct operations of assigned corps and divisions. An army group plans and directs campaigns in a theater, and is composed of two or more field armies under a designated commander. Army groups have not been employed by the Army since World War II.

Once the player has achieved the highest rank possible (General in the Army or Air Force, Fleet Admiral in the Navy, or Commandant of the Marine Corps) the patriot's role within the experience transitions fully to a command and control mode of all the lower ranking patriots within the game. All patriots can still exercise the combat skills they have obtained throughout the experience, but as the patriot advances in rank, so does the complexity of each mission. High ranking patriots are at a premium, and should always occupy areas furthest from the battlefield based upon rank.

For the first release of The Patriots of Freedom the focus is on only up to Company level of troop formations. This makes Captain (in the Army, Air Force, and Marine Corps) or Lieutenant (in the Navy) the highest attainable rank possible within the first release of The Patriots of Freedom. Understanding and utilizing player dossiers become more vital as a virtual patriot moves up in rank. A good Captain or Lieutenant will choose good Sergeants or Petty Officers to help fulfill mission objectives because good Sergeants or Petty Officers will choose the better enlisted personnel to join their platoon.

The Patriots of Freedom offers genuine "in-game advertising" to legitimate companies. For example, billboards, car dealerships, stores, etc. that are elements comprising the game environment will be companies that exist today and their goods and services are available for players within the game to access and acquire.

For example, a known store could be one of the store fronts that a virtual patriot walks into during the course of play. The virtual patriot sees a car stereo system on sale in the store and elects to use his points to buy the system. The decision to by the car stereo system is confirmed by the member, and the total cost of the order less the available dollarized amount of reward points is then charged directly to the member's credit card account already on file used to pay for the monthly/yearly membership fee.

The Patriots of Freedom invokes genuine player networking and true team-building exercises to obtain better points and rewards. Using member dossiers to determine who the best players are that will increase the chances of mission success is a very integral part of the playing experience. The Patriots of Freedom has both a passive and active point collection area.

Within the passive points area players earn one point per hour, just like they normally would for playing any other online game. In the passive area the life of the virtual patriot is comparable to that of boot camp drills, military maneuvers, combat training, and war game simulations. These exercises are designed to improve on the virtual patriot's proficiency, network with other virtual patriots, and amass data with the member dossier to assess skills alongside other member dossiers accordingly.

During the course of training the virtual patriot may be killed. Exercises like capturing a flag, search and destroy, find and rescue, etc. require the engagement and elimination of other virtual patriots who are also increasing their skills. The death of a virtual patriot is not permanent during these passive point exercises, and the patriot may be reanimated and free to re-enter the combat area from a safe location.

Within passive play mode special one-time missions are offered that are loosely tied into current world events. For example, a world leader who is hostile towards the U.S., and who has been a known supporter of anti-US activities while funding terrorism, is scheduled to speak at the United Nations. Silencing this leader without implicating the U.S. government enables accumulation of a large amount of activity points for the squad or platoon able to successfully fulfill the mission without being detected.

For example, 250,000 points is offered to the squad (or platoon) that successfully completes the mission. The 250,000 points are divided up among the surviving members of the mission. The lower the number of surviving patriots, the greater percentage of reward points allotted to each surviving patriot. Items of great value (e.g., large-screen HDTV) become more accessible as the other patriots are eliminated during the mission. Conversely, the mission becomes more difficult and harder to complete as patriots are eliminated and the overall strength of the squad (or platoon) is reduced.

Only passive points are earned if a special one-time mission is not completed. Additionally, there are no retries if the patriot fails to complete a special one-time mission. Should no one complete the special one-time mission then the 250,000 points remain unallocated, and the mission is deemed incomplete.

Within the active play (or Campaign) mode the virtual patriot is required to fulfill a clearly defined large-scale live mission that requires the combined forces of all four branches of the military. Missions within active play have a specific start time and are real-time do-or-die situations for every virtual patriot entering the battlespace. Unlike special one-time missions within the passive play area, if the patriot is eliminated during a live action mission there is no reanimation.

Members will spend many hours developing their patriot, and being eliminated during a live action campaign will be a cause of great duress. Members may not want to start over by creating a brand new patriot and may instead pay a small charge to reanimate their virtual patriot eliminated during a live action mission. This reanimation fee is charged directly to the member's credit card information already on file for paying the membership fee.

A patriot reanimated for a fee is restored back with all attributes, experience, and assets intact. The only difference for the virtual patriot is that 25% of the total reward points have been lost. Even a virtual death must carry some consequences. Since the percentage of points available to each surviving patriot increases as other patriots are eliminated, there is a strong potential for a virtual patriot to display unethical, dishonorable characteristics by purposefully eliminating a squad member within a given live action mission. If a virtual patriot purposefully eliminates another member during a live mission, that patriot's "reputation" attribute is diminished and logged into their dossier. A patriot with a less than favorable reputation is more apt to be passed over by squad leaders, Lieutenants, and Captains for inclusion on a mission. Patriots with unfavorable reputations could band together and form splinter cells, death squads, or mercenary groups ideal for carrying out special one-time missions.

Should the virtual patriot be purposefully eliminated during a live action and elects to pay for reanimation, the option of purchasing a tracking beacon to locate the virtual patriot responsible for the demise is available. At any time during a live action the virtual patriot responsible for eliminating the member's patriot may be targeted. Additional points can be use to coerce and entice other virtual patriots to either attack or protect the member's patriot from other virtual patriots who have a locator fixed upon the member's virtual patriot. The amount of points needed to coerce or entice other virtual patriots is negotiated based solely upon what the member is willing to give up in exchange for security within the battlespace.

Example 2

Nuclear Jihad Game

The following is a basic outline of the game entitled "Nuclear Jihad," which may be employed in one embodiment of this invention.

Scientists from America, England, Italy, and Israel have collaborated to discover the most powerful compound in the universe. The plan is for the four branches of the U.S. Military to take one of the four elements each to a designated area, an island that is controlled by the U.S. in the Atlantic Ocean. With minimal crew and under complete secrecy they plan to mix and test the new compound. Foreign governments sponsoring terrorists have discovered where the meeting will take place and stage a massive attack to steal the individual elements.

The surprise attack is successful and the individual elements are brought back separately to four different counties for analysis and processing. Their plan is to mass produce each element, then eventually meet up to combine their elements for use against the USA. As a safeguard a small portion of each element is shared amongst the terrorist cells within the four countries. Each country has the four elements and the ability to have an enormous bomb.

The U.S. government knows that once the four elements are successfully joined together a strike against high value targets within America will occur. Additionally, the U.S. government fears an information leak that could lead to widespread panic, so the decision is made to get the elements back using whatever force necessary. Each branch sends out teams to track down and take back each element. Each branch has a different mission and country they must invade:

Army—Syria
Marines—Germany
Air Force—Kuwait
Navy—Sri Lanka

Each branch must complete several objectives to seek out and recapture the elements. Patriots must work together in a coordinated effort to secure their area and complete the mission. If one branch has problems in recovering the element, other branches that are successful are required to provide support and help complete the mission. The mission is a failure if all four elements are not recovered and brought back to the U.S.

For virtual patriots who do not wish to join a platoon commanded by member, another option is to sign up with a platoon commanded by one of the CPU characters. CPU leaders are extremely proficient and are seldom eliminated from the battlespace. A mission is considered incomplete if the only surviving members are CPU controlled.

The four main CPU characters guiding the member through basic training are:

1. Slice—A machete-wielding warrior who has the ability to cut anyone in two.
2. Rick O'Shea—An expert marksman who can shoot from any angle and determine how to ricochet the bullet.
3. Torch—Scarred soldier who wields a flame-thrower as his defense.
4. Dutch—A cigar chomping berserker who is lethal in hand-to-hand combat and commands a mastery over almost any weapon or machinery.

In addition to all of today's standard issue firearms and weapons available for use, future weapons and systems are also be available for use based upon proficiencies and game play.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A reward system for a player of video games or computer games, wherein the system comprises:
   (a) a gaming platform for the player's participation in a video game or computer game wherein the player's participation in the video game or computer game influences the outcome of the game;
   (b) a data collection module in communication with the gaming platform, wherein the data collection module obtains and stores information received from the gaming platform and assigns rewards points based upon the data collected from the player's performance in the video game or computer game and predetermined parameters; and
   (c) a purchasing module comprising at least one search engine bot, the purchasing module in communication with the data collection module, wherein the purchasing module receives information from the data collection module regarding a player's purchasing choices and reward points, wherein the at least one search engine bot obtains information from at least one vendor regarding the player's purchasing choices, and wherein the purchasing module arranges for the purchase of items corresponding to the player's purchasing choices.

2. The reward system of claim 1, wherein the gaming platform is a personal computer or a video game system.

3. The reward system of claim 1, wherein the gaming platform is at least one server.

4. The reward system of claim 1, wherein the player accesses the gaming platform using at least one of a personal computer, video game system, telephone or PDA.

5. The reward system of claim 1, wherein the data collection module is at least one computer server.

6. The reward system of claim 1, wherein the purchasing module is at least one computer server.

7. The reward system of claim 1, wherein the gaming platform, data collection module and purchasing module are all in communication via the Internet.

8. The reward system of claim 1, wherein the data collection module obtains and stores encrypted information.

9. A method of using a reward system which provides rewards for a player of video or computer games, wherein the method comprises:
   (a) providing a reward system for a player of video games or computer games, wherein the system comprises:
       (i) a gaming platform for the player's participation in a video game or computer game wherein the player's participation in the video game or computer game influences the outcome of the game,
       (ii) a data collection module in communication with the gaming platform, wherein the data collection module obtains and stores information received from the gaming platform and assigns rewards points based upon the data collected from the player's performance in the video game or computer game and predetermined parameters, and
       (iii) a purchasing module comprising at least one search engine bot, the purchasing module in communication with the data collection module, wherein the purchasing module receives information from the data collection module regarding a player's purchasing choices and reward points, wherein the at least one search engine bot obtains information from at least one vendor regarding the player's purchasing choices, and wherein the purchasing module arranges for the purchase of items corresponding to the player's purchasing choices;
   (b) transmitting information from the gaming platform to the data collection module relating to the player;
   (c) transmitting information from the data collection module relating to the purchasing module regarding the player's purchasing choices and reward points; and
   (d) arranging for the purchase of items corresponding to the player's purchasing choices.

10. The method of claim 9, wherein the information transmitted from the gaming platform to the data collection module includes information relating to the player's performance with respect to at least one game.

11. The method of claim 9, wherein the data collection module obtains and stores encrypted information.

* * * * *